Oct. 20, 1959     A. SOMERVILLE     2,909,204
COMPOSITE BONDED STRUCTURE AND METHOD OF MAKING THE SAME
Filed Oct. 23, 1953

INVENTOR
Alexander Somerville
BY
ATTORNEY

United States Patent Office 2,909,204
Patented Oct. 20, 1959

2,909,204

COMPOSITE BONDED STRUCTURE AND METHOD OF MAKING THE SAME

Alexander Somerville, Birmingham, Mich., assignor to General Motors Corporation, Detroit, Mich., a corporation of Delaware Application October 23, 1953, Serial No. 387,966

10 Claims. (Cl. 154—120)

This invention relates to improvements in uniting parts of a composite structure and more particularly to an improved adhesive bond and a method of producing it. In the manufacture and mounting of mirrors, lenses, prisms and other optical glass composite structures in which there are glass to glass, glass to metal and metal to metal interfaces, as well as in the manufacture of other types of composite structures having component parts which must be securely bonded in a predetermined accurate alignment, prior bonding techniques have, in many instances, been unsatisfactory. Similarly, difficulties have also been encountered in prior methods of bonding plastic to rubber, or rubber to metal.

Generally, the prior methods of bonding have employed plastic, rubber or other organic adhesives requiring heat and/or pressure and in many instances the release of solvent in curing or setting of the adhesive. Such adhesives have imposed certain limitations on the characteristics and strength of the resultant bond. For example, the use of heat to facilitate curing is highly disadvantageous in many applications as in the manufacture of precision optical units where the optical glass components become strained by exposure to heat. Difficulties of this type are even more pronounced when the materials to be joined have different coefficients of thermal expansion. Joined while heated, severe internal strains occur in the composite structure when allowed to cool. Such strains in optical glass components cause warpage with resultant unpredictable local variations in the indices of refraction. Even if the coefficients of thermal expansion of the bonded materials are identical, which is rarely the case, the utilization of heat bonding techniques increases the difficulties of achieving and maintaining accurate alignment during curing of the adhesive.

The use of pressure to facilitate bonding is also objectionable because of the resultant warpage and the inability to accurately control the dimensions and alignment in the composite structure. Similarly, difficulties are involved in using adhesives which set or cure through solvent release. Such materials not only are generally porous but shrink considerably as the solvent escapes, again imposing undesirable strains on the component parts.

Accordingly, a principal object of the present invention is the provision of an improved bonding procedure which avoids the aforementioned difficulties. A further object is the provision of an adhesive bond having an improved dimensional stability and high strength over a wide temperature range. A further object is the provision of a substantially strain-free bond having a controllable degree of elasticity.

A further object is to provide a method of adhesively bonding articles of widely varying coefficients of thermal expansion into a composite structure having a high degree of dimensional stability. A still further object is the provision of an adhesive bond having an elasticity which is substantially constant throughout a wide range of temperatures. A still further object is the provision of an improved method of bonding to rubber and similar materials. These and other objects and advantages of the invention will appear more fully from the following description taken in connection with the accompanying drawing, in which:

The invention generally comprises joining members by means of one or more intermediate layers of plastic material to obtain a composite bonded structure having improved dimensional stability, high shear and tensile strength over a wide temperature range, and a controllable degree of elasticity to permit the bond to accommodate and relieve stresses resulting from relative changes in position or dimensions of the members. By the present invention it is possible to seal room-temperature setting plastics to rubber to form a resultant bond whose strength is dictated by the strength of the rubber. Moreover, the resultant surfaces of the plastic facilitate bonding the rubber to other materials.

In the practice of the present invention an intermediate bond structure or interlayer comprising a layer of rubber coated with a resinous adhesive is employed as a lamination between the members to be joined. Such an interlayer structure permits the use of a variety of types of rubber, natural and synthetic, which may be compounded to suit the particular application. It will be understood, of course, that such a rubber layer may be coated on one or both sides, and with the same or different adhesives. In many instances it is desirable to form an active surface on the rubber layer by coating the rubber with certain adhesives and subjecting the thus coated rubber to heat and pressure. If desired, vulcanization of the rubber can be accomplished at the same time.

Depending upon the coefficients of thermal expansion of the parts being joined it is generally desirable to augment the effectiveness of the rubber interlayer structure by coating the surfaces of the materials to be joined with adhesive materials which are particularly adapted to seal to the materials, while providing an additional intermediate adhesive adapted to bond to the interlayer structure as well as to the aforementioned adhesive applied to the parts to be joined. It will be understood of course that in certain instances, depending upon the particular application intended, the rubber may be bonded directly to one of the parts to be joined and one or more intermediate bonding layers employed between the rubber and the surface of the opposite part. Similarly, the present invention provides a method of forming an active surface on rubber permitting bonding of the rubber to metal, glass or other materials.

Figure 1:
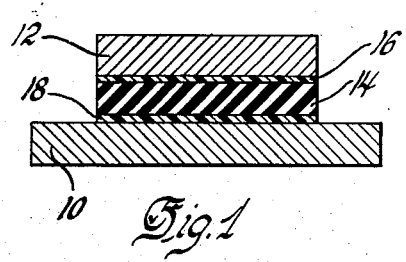
Fig. 1 is an enlarged schematic sectional view of a composite structure in accordance with the invention.

Referring more particularly to the drawing, Fig. 1 illustrates in schematic form a composite bonded structure, formed in accordance with the present invention, in which 10 and 12 indicate the parts to be joined. It will be understood that the parts 10 and 12 may be of metal, glass or other material or any combination thereof. A rubber interlayer structure is employed between the parts 10 and 12, this interlayer structure comprising a layer 14 of rubber and interface layers 16 and 18 of room-temperature setting plastic adapted to bond the rubber to the parts 10 and 12.

The structure shown in Fig. 1 may be formed by applying the layer 18 of room-temperature setting plastic to the part 10, adding the layer of rubber 14, the layer 16 of room-temperature setting plastic, which may or may not be the same material as layer 18, and subsequently adding the part 12. The resultant structure cures without the aid of heat, pressure or solvent release into an extremely strong composite structure in which a predetermined alignment of the parts 10 and 12 is easily maintained.

Figure 2:
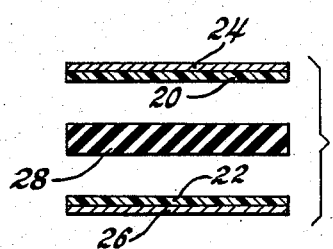
Fig. 2 is an exploded schematic sectional view illustrating the assembly of an intermediate bond structure in accordance with the invention.
Figure 4:
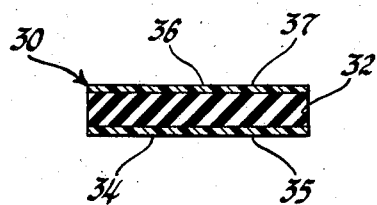
Fig. 4 is an enlarged schematic view of an interlayer structure produced by the steps shown in Figs. 2 and 3.

In many applications it is desirable to form an active surface on the rubber interlayer. In practice, this is accomplished in a preliminary treatment as shown in Fig. 2 by applying layers 20 and 22 of adhesive to metal foil layers 24 and 26, and forming a sandwich around a layer 28 of uncured rubber. Heat and pressure are then applied through heated platens 29 to form an interlayer structure 30 shown in Figure 4 comprising a core 32 of vulcanized rubber having layers 34 and 36 of plastic adhesive securely bonded to each side. By such a procedure active surfaces 35 and 37 are formed which, after removal of the metal foil layers 24 and 26 permit bonding the rubber directly to another surface using only a single adhesive without the aid of heat or pressure. Thus by the practice of the present invention it is now possible to form an improved composite bonded structure or to bond rubber directly to metal, glass, etc., as in the case of rubber weatherstripping and other sealing materials.

Figure 5:
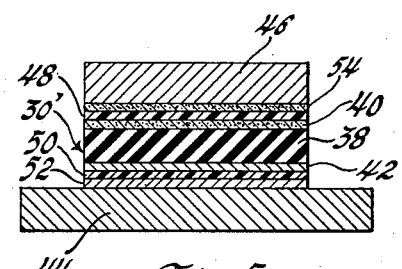
Fig. 5 is an enlarged schematic view of a composite structure embodying the invention.
Figure 3:
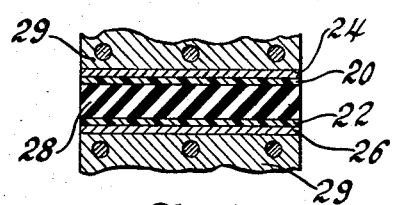
Fig. 3 is an enlarged schematic view illustrating the further treatment of the interlayer structure shown in Fig. 2 in accordance with the invention.

Fig. 5 illustrates a modification in accordance with the invention in which an interlayer structure 30', comprising a core 38 of rubber and interface layers 40 and 42 of adhesive bonded thereto, joins parts 44 and 46 through layers 48 and 50 of room-temperature setting adhesive and layers 52 and 54 of adhesive particularly adapted to seal on the parts 44 and 46.

Figure 6:
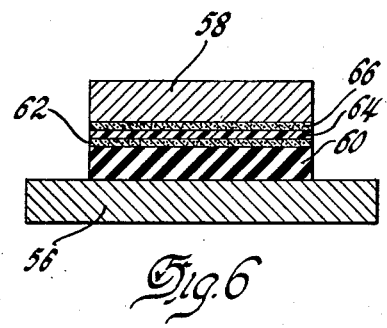
Fig. 6 is an enlarged schematic view illustrating another embodiment of the invention.

Fig. 6 illustrates another embodiment of the invention in which parts 56 and 58 are formed into an integral structure in which a layer 60 of rubber is bonded directly to part 56 and through interface layer 62 and layer 64 of room-temperature setting adhesive to a layer 66 of adhesive bonded to part 58.

Thus far it will be understood that the present invention provides an improved method of bonding in which the resultant structure must have high dimensional stability and in which the difficulties heretofore encountered in heat, pressure and solvent release methods of bonding must be avoided. By the practice of the present invention the bond elasticity is determined by the elasticity of the rubber employed in the interlayer structure and can be made substantially independent of temperature over a wide temperature range.

While the particular adhesive materials and the thicknesses of the coatings to be employed will be dictated by the particular application, I have found that superior results are obtained using room-temperature setting adhesives of the epoxy resin type. At present, I prefer to employ as room-temperature setting adhesives, resinous materials formed as condensation polymers from acetone, phenol and epichlorohydrin. These adhesives, essentially bis-phenol-epichlorohydrin condensates, may be blended with various resins such as melamine formaldehyde, urea formaldehyde or phenol formaldehyde, as well as with thermoplastic resins, plasticizers and extenders as desired. Similarly, the resins may be esterified with fatty acids, rosin or other resin acids, tall oil or mixtures of these with limited amounts of phthalic anhydride or other dibasic acids. In the practice of the present invention materials of this type have added thereto activators which are generally amine type catalysts such as triethylene tetramine or hexamethylene tetramine to facilitate curing. At present, I prefer to use such room-temperature setting plastic adhesives known as "Armstrong C-4 Cement" manufactured by the Armstrong Products Company. This adhesive or cement is of the epoxy resin type.

The adhesives employed to form interface layers on the surface of the parts to be joined are selected to bond well to the part to be joined and to the intermediate adhesive layers. In forming composite structures of metal, glass to metal and glass to glass, an excellent adhesive for coating the metal or glass surfaces is the ethoxylene resin product known as "Araldite" manufactured by the Ciba Corporation. This resin adhesive preferably is applied to the surface of the parts to be coated and preferably is oven cured. In certain applications it is desirable to form the surface coatings on the parts to be joined from a room-temperature setting adhesive such as the aforementioned "Armstrong C-4 Cement."

The selection of the rubber material forming an intermediate layer in adhesive bonds embodying the invention is dictated by the particular application intended. Generally, however, natural rubber as well as various synthetic rubbers may be used. Prior difficulties in obtaining a satisfactory adhesive bond to rubber have been overcome in the present invention by forming an active surface on the rubber in a pretreatment which comprises the application of heat and pressure to the rubber material through an aluminum, copper or similar metallic foil having an adhesive coating in contact with the rubber so as to bond the adhesive securely to the rubber. Although the times and temperatures required for an optimum curing of the adhesive coatings on the rubber will depend upon the type of rubber used, its compounding and the particular adhesive employed, we have found that in many instances satisfactory results are obtained by curing at a temperature within the range from about 200° F. to 450° F. for approximately 5 to 40 minutes while a pressure within the range from about 1000 p.s.i. to 2500 p.s.i. is applied to the rubber-adhesive sandwich. In many instances it is preferred to apply the adhesive to an uncured rubber material so that the rubber is cured or vulcanized simultaneously with the application of adhesive thereto.

It will be understood, of course, that suitable rubber additives may be incorporated into the rubber material used for the interlayer structure to provide the desired resilience, curing characteristics and other properties necessary for the intended application. The rubber additives typically include vulcanizing agents such as sulfur, selenium, tellurium, sulfur chloride and tetramethylthiuram disulfide; vulcanization accelerators such as mercaptobenzothiazole, diphenylguanidine, tetramethylthiuram disulfide and acetaldehydeaniline; accelerator activators such as stearic acid and lead monoxide; antioxidants or age resistors such as di-B-naphthyl-p-phenylenediamine, phenyl-α-naphthylamine, phenyl-B-naphthylamine and 4,4'-diaminodiphenylamine; accelerator retarders such as phenol or benzoic acid; plasticizers and softeners such as vegetable and mineral oils, pine tar, rosin, zinc or lead soaps and stearic acid; stiffeners such as benzidine and p-aminophenol; and reinforcing pigments such as carbon black, zinc oxide, clays and blanc fixe. The following composition in which the various ingredients are indicated as parts by weight is illustrative of a suitable rubber material for use in the practice of the present invention:

| | |
|---|---|
| Smoked natural rubber | 100 |
| Plasticizer (Reogen) | 1 |
| Stearic acid | 4 |
| Polymerized trimethyl dihydroquinoline | 1 |
| Zinc oxide | 15 |
| Carbon black | 80 |
| Sulfur | 3 |
| Tetramethylthiuram disulfide | 1 |

At present I prefer to employ as the adhesive forming the active surface on the rubber material the commercially available substance known as "Ty-Ply-Q" a product of Rohm and Haas Corporation. "Ty-Ply-S" also may be used in this application and is particularly desirable when a synthetic rubber material is used. Such materials are conveniently applied dissolved in a solvent such as xylene or toluene.

While the thicknesses of the various intermediate layers is dependent on the particular structure, I have found that in forming composite bonded structures the rubber layer generally should have a thickness within the range from about .005" to .025". The various layers of adhesive are preferably quite thin, having a thickness of about .005". It will be understood of course that the above-described method of forming an active surface on rubber materials is equally applicable to thick sections of rubber such, for example, as rubber weatherstrip or molding sections upon which it is desired to form an active surface to facilitate bonding the section to another material.

The following is a particular example of the formation of a composite bonded structure in accordance with the present invention. In sealing a glass element to steel, the surfaces of the glass and steel which are to be joined are coated with an epoxy resin such as Araldite dissolved in acetone. These coatings are then oven cured at a temperature of 270° F. for 2½ hours to form the desired surface coatings. To relieve strains which would otherwise result in the glass it is cooled to room temperature at the rate of about 10° per hour. The rubber interlayer structure is fabricated by applying "Ty-Ply-Q" to aluminum foil. A layer of uncured natural rubber, properly compounded and calendered, is then placed between two pieces of this coated aluminum foil so that the adhesive on the foil is in contact with the uncured rubber sheet. The resulting sandwich is then cured at a temperature of about 310° F. for 20 minutes at 1800 p.s.i. The aluminum foil subsequently is peeled off to expose the surfaces of the adhesive layers now bonded tenaciously to the rubber.

The composite structure is then assembled by placing this rubber interlayer structure between the aforementioned steel and glass parts whose surfaces are coated with an interface layer of adhesive and a thin layer of room-temperature setting adhesive, i.e. Armstrong cement is applied to both sides of the rubber interlayer structure. Since no heat, pressure or solvent release is involved in the curing of the adhesive in the assembly operation, no shrinkage or strain imposition is encountered. Accordingly, the assembled structure can be allowed to cure while positioned in fixtures or jigs designed to insure proper alignment in the parts in the completed structure.

It is to be understood that, although the invention has been described with specific reference to particular embodiments thereof, it is not to be so limited since changes and alterations therein may be made which are within the full intended scope of this invention as defined by the appended claims. The term "rubber" as used in the claims is intended to include both natural and synthetic rubbers.

What is claimed is:

1. A method of forming a bonded, dimensionally stable, strain-free structure comprising at least two rigid members having different coefficients of thermal expansion bonded together through an elastic, rubber layer, said method comprising applying an adhesive coating to a surface of each of the parts to be joined, curing said adhesive coatings, applying an adhesive layer to each side of said elastic rubber layer, subjecting the adhesive layers to heat and pressure through a flexible, heat-resistant metal foil for a time sufficient to cause said adhesive layers to cure whereby said rubber sides are activated for adhesive bonding, and uniting the adhesive coated surfaces of said members through said rubber layer by means of a substantially solvent-free, room-temperature setting epoxy resin adhesive at substantially room temperature.

2. A method of forming a bonded, dimensionally stable, strain-free structure comprising at least two rigid members having different coefficients of thermal expansion and at least one of which is an optical member, bonded together through an elastic, rubber layer, said method comprising applying an adhesive layer to each side of an elastic rubber layer and subjecting the adhesive layers to heat and pressure through a flexible, heat-resistant metal foil for a time sufficient to cure said adhesive layer whereby the sides of said rubber layer are activated for subsequent adhesive bonding, and uniting said rigid members through said rubber layer by means of a substantially solvent-free, room-temperature setting epoxy resin adhesive at substantially room temperature.

3. A method of bonding at least two rigid parts having different coefficients of thermal expansion into a dimensionally stable unitary structure, said method comprising the steps of applying an organic room-temperature setting resin adhesive to the surfaces of the parts to be joined and uniting said surfaces through an elastic layer of rubber by means of said adhesive at substantially room temperature.

4. An improved composite dimensionally stable structure comprising at least two members having different coefficients of thermal expansion adhesively joined through an interposed layer of elastic rubber by means of a room-temperature setting resin adhesive.

5. In a method of forming a dimensionally stable substantially strain free composite article comprising at least two rigid members at least one of which is a glass optical member and has a different coefficient of thermal expansion than said other member, the improvement which comprises uniting surfaces of said members through an elastic layer of rubber by means of a substantially solvent-free room-temperature setting epoxy resin adhesive.

6. A composite article comprising a rigid optical member and a rigid backing member having different coefficients of thermal expansion bonded through an elastic layer of rubber by means of a substantially solvent-free room-temperature setting epoxy resin adhesive.

7. The article as in claim 6 in which the elastic layer has a thickness within the range of approximately .005 inch to .025 inch.

8. In a method of joining rubber to another member the steps of forming an active surface on the rubber to facilitate adhesive bonding thereagainst comprising coating said rubber with a resinous adhesive, placing a flexible, heat resistant foil over said adhesive in contact therewith and applying heat and pressure to the resultant structure for a time sufficient to cure said adhesive into the surface of said rubber.

9. In a method of joining rubber to another member the steps of forming an active surface on the rubber to facilitate adhesive bonding thereagainst comprising coating said material with an adhesive, placing a flexible, heat resistant foil over said adhesive in contact therewith, applying heat and pressure to the resultant structure for a time sufficient to cure said adhesive into the surface of said rubber, and thereafter removing said flexible foil to expose said active surface.

10. In a method of joining rubber to another member the steps of forming an active surface on the rubber to facilitate adhesive bonding thereagainst comprising coating said material with an adhesive, placing a thin metallic foil over said adhesive in contact therewith, subjecting said resultant structure to an elevated pressure while at a temperature within the range of approximately 200° F. to 450° F., and thereafter removing said flexible foil to expose said active surface.

(References on following page)

References Cited in the file of this patent

UNITED STATES PATENTS

| | | |
|---|---|---|
| 33,523 | Falke | Oct. 22, 1861 |
| 1,954,219 | Moyses | Apr. 10, 1934 |
| 2,267,470 | Kabela et al. | Dec. 23, 1941 |
| 2,276,035 | Guhl | Mar. 10, 1942 |
| 2,575,558 | Newey et al. | Nov. 20, 1951 |
| 2,599,359 | Banks | June 3, 1952 |
| 2,613,397 | Borkland | Oct. 14, 1952 |
| 2,622,044 | Martens | Dec. 16, 1952 |
| 2,650,185 | Larson et al. | Aug. 25, 1953 |
| 2,706,166 | Gurney | Apr. 12, 1955 |
| 2,708,289 | Collings | May 17, 1955 |
| 2,723,962 | Hedges et al. | Nov. 15, 1955 |

OTHER REFERENCES

"Ethoxylines" by Preiswerk and Charlton, Modern Plastics, November 1950, pages 85–88.